US010963286B2

(12) United States Patent
Xie et al.

(10) Patent No.: US 10,963,286 B2
(45) Date of Patent: Mar. 30, 2021

(54) LIVE MIGRATION METHOD AND APPARATUS FOR VIRTUAL MACHINE PASSTHROUGH DEVICE

(71) Applicant: BEIJING BAIDU NETCOM SCIENCE AND TECHNOLOGY CO., LTD., Beijing (CN)

(72) Inventors: Yongji Xie, Beijing (CN); Wen Chai, Beijing (CN); Yu Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 92 days.

(21) Appl. No.: 16/353,136

(22) Filed: Mar. 14, 2019

(65) Prior Publication Data

US 2019/0377594 A1    Dec. 12, 2019

(30) Foreign Application Priority Data

Jun. 8, 2018    (CN) .......................... 201810590075.8

(51) Int. Cl.
*G06F 9/44*    (2018.01)
*G06F 9/455*    (2018.01)

(52) U.S. Cl.
CPC .............. *G06F 9/45558* (2013.01); *G06F 2009/45562* (2013.01)

(58) Field of Classification Search
CPC ............ G06F 9/45558; G06F 2009/45562
See application file for complete search history.

(56) References Cited

U.S. PATENT DOCUMENTS

2009/0119087 A1    5/2009  Ang et al.
2010/0250824 A1*   9/2010  Belay .................. G06F 9/45558
                                                    711/6
2013/0305246 A1*  11/2013  Goggin ................ H04L 47/783
                                                    718/1

(Continued)

FOREIGN PATENT DOCUMENTS

CN        102185774 A    9/2011
CN        102262557 A    11/2011

(Continued)

*Primary Examiner* — Hang Pan
(74) *Attorney, Agent, or Firm* — Seed IP Law Group LLP

(57) ABSTRACT

A live migration method for a virtual machine passthrough device, includes: performing a register state synchronization method by calling a register state synchronization interface; cancelling a passthrough state of the source virtual machine passthrough device, and migrating the source virtual machine passthrough device to the target virtual machine by iteratively executing multiple rounds of a synchronization operation as following: performing the register state synchronization method by calling the register state synchronization interface to capture a read/write operation on a register of the source virtual machine passthrough device in a migration process, and executing the captured read/write operation on a register of a target virtual machine passthrough device; and performing a DMA dirty page synchronization method by calling a configured DMA dirty page transmission interface, to write data corresponding to a DMA dirty page identified by the source virtual machine passthrough device into a memory of the target virtual machine.

15 Claims, 5 Drawing Sheets

(56) References Cited

U.S. PATENT DOCUMENTS

| | | |
|---|---|---|
| 2015/0058838 A1 | 2/2015 | Tsirkin |
| 2015/0234617 A1* | 8/2015 | Li .......................... G06F 3/0617 |
| | | 711/114 |
| 2016/0026489 A1* | 1/2016 | Maislos .............. G06F 9/45558 |
| | | 718/1 |
| 2017/0046184 A1 | 2/2017 | Tsirkin et al. |
| 2017/0090965 A1 | 3/2017 | Tsirkin |
| 2018/0046483 A1 | 2/2018 | Tsirkin et al. |

FOREIGN PATENT DOCUMENTS

| | | |
|---|---|---|
| CN | 103823638 A | 5/2014 |
| CN | 107844304 A | 3/2018 |

* cited by examiner

LIVE MIGRATION METHOD AND APPARATUS FOR VIRTUAL MACHINE PASSTHROUGH DEVICE

CROSS-REFERENCE TO RELATED APPLICATIONS

This application claims priority to Chinese Patent Application No. 201810590075.8, filed with the China National Intellectual Property Administration (CNIPA) on Jun. 8, 2018, the content of which is incorporated herein by reference in its entirety.

TECHNICAL FIELD

Embodiments of the present disclosure relate to the field of computer technology, specifically to the field of virtual machine live migration technology, and more specifically to a live migration method and apparatus for a virtual machine passthrough device.

BACKGROUND

Virtual machine is a complete computer system simulated by a software, having complete hardware system functions and running in a completely isolated environment. A virtual machine usually runs on a host machine, and each host machine may have multiple virtual machines running thereon.

In the cloud computing, a passthrough device may directly passthrough the peripheral component interface express (PCI-E) device on a host machine to a virtual machine, so that the virtual machine may directly access to the device without going through the virtual machine monitor (VMM) on the host machine, which enables the device to achieve optimal performance in the virtual machine. However, since the data transmission of the passthrough device does not require the participation of the virtual machine monitor, the virtual machine monitor cannot obtain the state of the passthrough device during the live migration of the virtual machine, and thus cannot configure the device state on a new virtual machine. Therefore, the passthrough device cannot achieve live migration.

SUMMARY

Embodiments of the present disclosure provide a thermal migration method and apparatus for a virtual machine passthrough device.

In a first aspect, the embodiments of the present disclosure provide a live migration method for a virtual machine passthrough device, including: performing a register state synchronization method by calling a configured register state synchronization interface, to synchronize a register state of a source virtual machine passthrough device to a target virtual machine; cancelling a passthrough state of the source virtual machine passthrough device, and migrating the source virtual machine passthrough device to the target virtual machine by iteratively executing multiple rounds of a synchronization operation; the synchronization operation including: performing the register state synchronization method by calling the configured register state synchronization interface, to capture a read/write operation on a register of the source virtual machine passthrough device in a migration process, and executing the captured read/write operation on a register of a target virtual machine passthrough device; and performing a DMA dirty page synchronization method by calling a configured DMA dirty page transmission interface, to write data corresponding to a DMA dirty page identified by the source virtual machine passthrough device into a memory of the target virtual machine.

In some embodiments, the performing a register state synchronization method by calling a configured register state synchronization interface to synchronize a register state of a source virtual machine passthrough device to a target virtual machine includes: executing an operation of transferring the register state of the source virtual machine passthrough device to a virtual machine monitor by calling the configured register state synchronization interface, and synchronizing the register state acquired by the virtual machine monitor at the target virtual machine; and the performing the register state synchronization method by calling the configured register state synchronization interface to capture a read/write operation on a register of the source virtual machine passthrough device in a migration process, includes: executing an operation of transferring a record of the read/write operation on the register of the source virtual machine passthrough device in the migration process to the virtual machine monitor by calling the configured register state synchronization interface.

In some embodiments, the performing a DMA dirty page synchronization method by calling a configured DMA dirty page transmission interface, to write data corresponding to a DMA dirty page identified by the source virtual machine passthrough device into a memory of the target virtual machine includes: executing an operation of transferring the DMA dirty page identified by the source virtual machine passthrough device to the virtual machine monitor by calling the configured DMA dirty page transmission interface; and reading, by the target virtual machine, the DMA dirty page acquired by the virtual machine monitor, parsing the DMA dirty page to obtain data modified in the migration process by DMA, and writing the data obtained by parsing into the memory of the target virtual machine.

In some embodiments, the method further includes: reading a device ID of the source virtual machine passthrough device; the performing a register state synchronization method by calling a configured register state synchronization interface includes: performing a register state synchronization method associated with the device ID by calling the configured register state synchronization interface; and the performing a DMA dirty page synchronization method by calling a configured DMA dirty page transmission interface includes: performing the DMA dirty page synchronization method associated with the device ID by calling the configured DMA dirty page transmission interface.

In some embodiments, the performing a register state synchronization method by calling a configured register state synchronization interface to synchronize a register state of a source virtual machine passthrough device to a target virtual machine includes: reading a content of a read/write register of the source virtual machine passthrough device by calling the register state synchronization interface, and transferring and writing the content of the read/write register of the source virtual machine passthrough device to a read/write register of the target virtual machine passthrough device; capturing and recording a read/write operation of the source virtual machine passthrough device on the read/write register by calling the register state synchronization interface, and executing the read/write operation of the source virtual machine on the target virtual machine passthrough device, to synchronize a content of a state register of the source virtual machine passthrough device to a state register of the target virtual machine passthrough device.

In a second aspect, the embodiments of the present disclosure provide a live migration apparatus for a virtual machine passthrough device, including: a register state synchronization unit, configured to perform a register state synchronization method by calling a configured register state synchronization interface, to synchronize a register state of a source virtual machine passthrough device to a target virtual machine; an incremental data synchronization unit, configured to cancel a passthrough state of the source virtual machine passthrough device, and migrate the source virtual machine passthrough device to the target virtual machine by iteratively executing multiple rounds of a synchronization operation; the incremental data synchronization unit includes a register read/write data synchronization unit and a DMA dirty page synchronization unit, the register read/write data synchronization unit is configured to perform the following synchronization operations: performing the register state synchronization method by calling the configured register state synchronization interface, to capture a read/write operation on a register of the source virtual machine passthrough device in a migration process, and executing the captured read/write operation on a register of a target virtual machine passthrough device; and the DMA dirty page synchronization unit is configured to perform the following synchronization operations: performing a DMA dirty page synchronization method by calling a configured DMA dirty page transmission interface, to write data corresponding to a DMA dirty page identified by the source virtual machine passthrough device into a memory of the target virtual machine.

In some embodiments, the register state synchronization unit is further configured to: execute an operation of transferring the register state of the source virtual machine passthrough device to a virtual machine monitor by calling the configured register state synchronization interface, and synchronize the register state acquired by the virtual machine monitor at the target virtual machine; and the register read/write data synchronization unit is further configured to: execute an operation of transferring a record of the read/write operation on the register of the source virtual machine passthrough device in the migration process to the virtual machine monitor by calling the configured register state synchronization interface.

In some embodiments, the DMA dirty page synchronization unit is further configured to: execute an operation of transferring the DMA dirty page identified by the source virtual machine passthrough device to the virtual machine monitor by calling the configured DMA dirty page transmission interface; and read, by the target virtual machine, the DMA dirty page acquired by the virtual machine monitor, parse the DMA dirty page to obtain data modified in the migration process by DMA, and write the data obtained by parsing into the memory of the target virtual machine.

In some embodiments, the apparatus further includes: a reading unit, configured to read a device ID of the source virtual machine passthrough device; the register state synchronization unit is further configured to perform a register state synchronization method associated with the device ID by calling the configured register state synchronization interface; the register read/write data synchronization unit is further configured to perform a register state synchronization method associated with the device ID by calling the configured register state synchronization interface; and the DMA dirty page synchronization unit is further configured to perform a DMA dirty page synchronization method associated with the device ID by calling the configured DMA dirty page transmission interface.

In some embodiments, the register state synchronization unit is further configured to synchronize a register state of a source virtual machine passthrough device to a target virtual machine as follows: reading a content of a read/write register of the source virtual machine passthrough device by calling the register state synchronization interface, and transferring and writing the content of the read/write register of the source virtual machine passthrough device to a read/write register of the target virtual machine passthrough device; capturing and recording a read/write operation of the source virtual machine passthrough device on the read/write register by calling the register state synchronization interface, and executing the read/write operation of the source virtual machine on the target virtual machine passthrough device, to synchronize a content of a state register of the source virtual machine passthrough device to a state register of the target virtual machine passthrough device.

In a third aspect, the embodiments of the present disclosure provide a server, including: one or more processors; and a storage apparatus, for storing one or more programs, and the one or more programs, when executed by the one or more processors, cause the one or more processors to implement the thermal migration method for a virtual machine passthrough device as provided by the first aspect.

In a fourth aspect, the embodiments of the present disclosure provide a computer readable storage medium, storing a computer program thereon, the computer program, when executed by a processor, implements the thermal migration method for a virtual machine passthrough device as provided by the first aspect.

The live migration method and apparatus for a virtual machine passthrough device provided by the embodiments of the present disclosure first perform a register state synchronization method by calling a configured register state synchronization interface, to synchronize a register state of a source virtual machine passthrough device to a target virtual machine; then cancel a passthrough state of the source virtual machine passthrough device, and migrate the source virtual machine passthrough device to the target virtual machine by iteratively executing multiple rounds of a synchronization operation, the synchronization operation including: performing the register state synchronization method by calling the register state synchronization interface, to capture a read/write operation on a register of the source virtual machine passthrough device in a migration process, and executing the captured read/write operation on a register of a target virtual machine passthrough device; and perform a DMA dirty page synchronization method by calling a configured DMA dirty page transmission interface, to write data corresponding to a DMA dirty page identified by the source virtual machine passthrough device into a memory of the target virtual machine. The data related to the source virtual machine passthrough device may be transferred to the target virtual machine during the virtual machine live migration through the configured register state synchronization interface and the DMA dirty page transmission interface, thereby realizing the live migration of the passthrough device without changing the virtual machine kernel.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the convenience of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
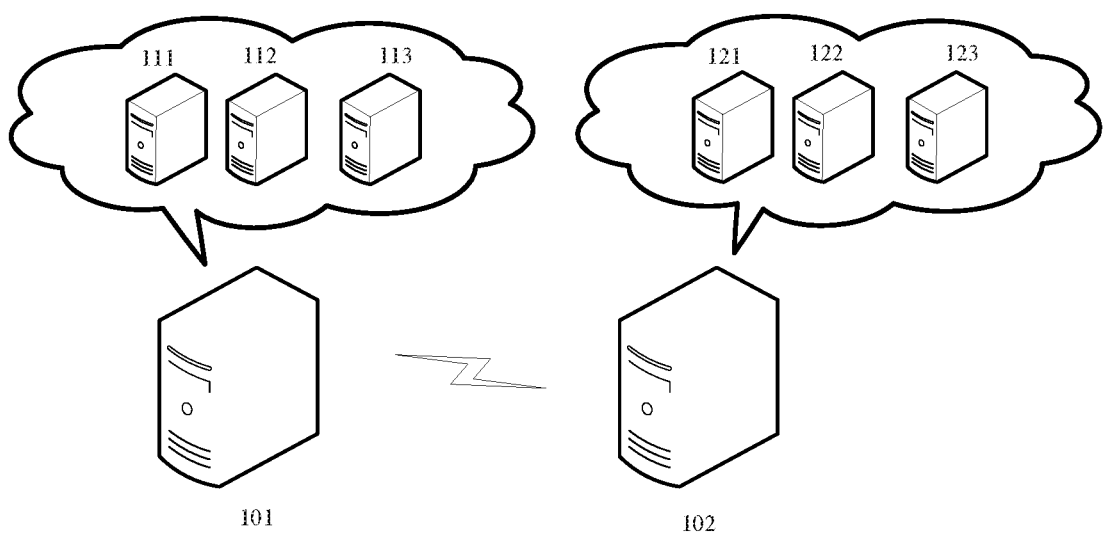
FIG. 1 is an exemplary system architecture diagram to which an embodiment of the present disclosure may be applied.

FIG. 1 illustrates an exemplary system architecture 100 of a live migration method for a virtual machine passthrough device or a live migration apparatus for a virtual machine passthrough device to which the present disclosure may be applied.

As shown in FIG. 1, the system architecture 100 may include host machines 101, 102. The host machines 101, 102 may be connected through a network. The host machines 101, 102 may be physical machines on which virtual machines providing cloud computing run. The virtual machines 111, 112, 113 may run on the host machine 101, and the virtual machines 121, 122, 123 may run on the host machine 102. Mutual communication is possible between the virtual machines 111, 112, 113 running on the same host machine 101, between the virtual machines 121, 122, 123 running on the same host machine 102, and between virtual machines running on different virtual machines 101 and 102.

A virtual machine may access to the hardware device of the host machine, for example, the virtual machine 111 may access to the hardware device of the host machine 101 through a device driver installed on the virtual machine 111. Generally, the behavior of that the device driver of the virtual machine 111 accesses to the hardware device of the host machine may be recorded by the virtual machine monitor on the host machine 101. Some hardware devices on the host machine 101, such as a network card and a GPU (Graphics Processing Unit), may be accessed by a virtual machine in a "passthrough" mode, and these devices may be referred to as passthrough devices. In the "passthrough" mode, the virtual machine 111 may access to the hardware devices on the host machine through a virtual PCIE device without passing through the virtual machine monitor.

When the virtual machine needs to be maintained, it is usually possible to completely save the running state of the virtual machine and restore it to another platform, that is, live migration of the virtual machine is performed. For example, when the virtual machine 101 in FIG. 1 needs maintenance, the running state of the virtual machine 111 may be migrated to other virtual machines 112, 113 on the same host machine or to the virtual machines 121, 122, 123 on other host machines.

In an actual scenario, the host machines 101, 102 may be servers that provide various cloud services, and the virtual machine monitors may run on the servers for managing and recording the state and operations of the virtual machines running on the servers.

It should be noted that the live migration method for a virtual machine passthrough device provided by the embodiments of the present disclosure may be executed by the host machines 101, 102 (servers), and accordingly, the live migration apparatus for the virtual machine passthrough device may be provided in the host machines 101, 102.

It should be noted that the server may be hardware or software. When the server is hardware, it may be implemented as a distributed server cluster composed of multiple servers, or as a single server. When the server is software, it may be implemented as multiple software or software modules (for example, multiple software modules for providing distributed services), or as a single software or software module, which is not specifically limited in the present disclosure.

It should be understood that the numbers of terminal devices, networks, or servers in FIG. 1 is merely illustrative. Depending on the implementation needs, there may be any number of terminal devices, networks, or servers.

Figure 2:
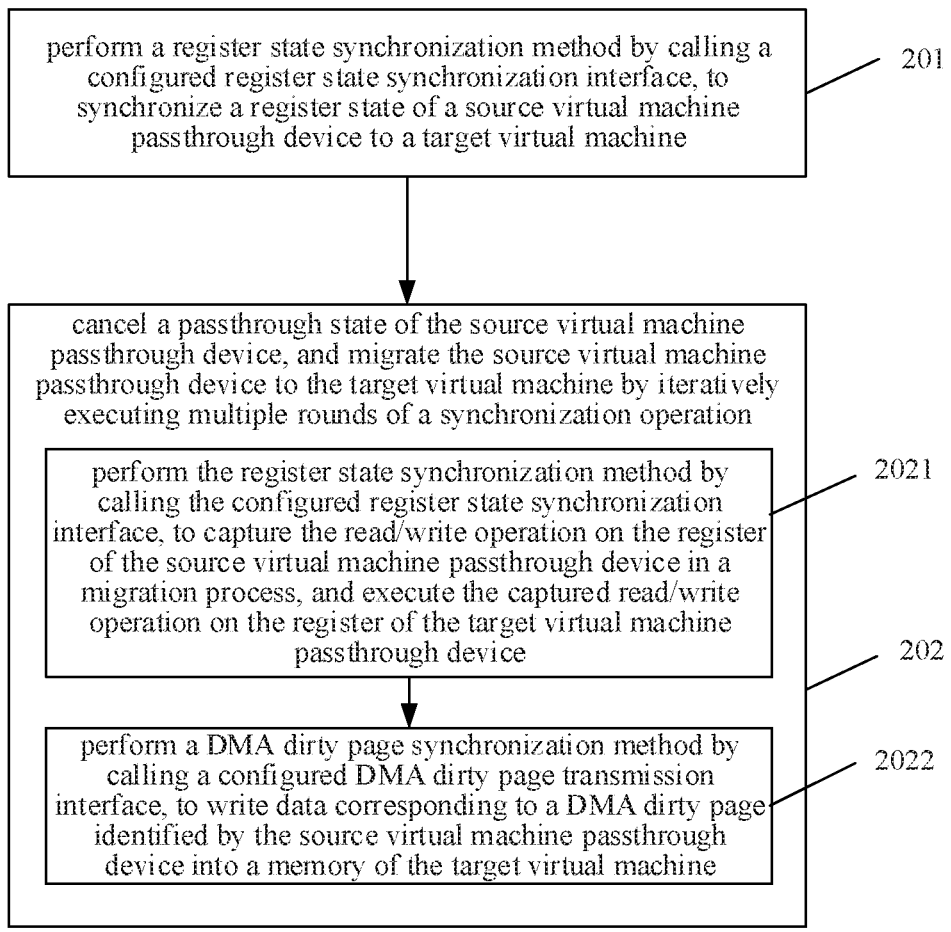
FIG. 2 is a flowchart of an embodiment of a live migration method for a virtual machine passthrough device according to the present disclosure.

With further reference to FIG. 2, a flow 200 of an embodiment of a live migration method for a virtual machine passthrough device according to the present disclosure is illustrated. The live migration method for a virtual machine passthrough device includes the following steps:

Step 201, performing a register state synchronization method by calling a configured register state synchronization interface, to synchronize a register state of a passthrough device of a source virtual machine to a target virtual machine.

In the present embodiment, the executing body (for example, the host machine 101 or 102 that the to-be-migrated virtual machine in FIG. 1 runs thereon) of the live migration method for a virtual machine passthrough device may pre-configure a register state synchronization interface. The register state synchronization interface may be an abstract interface of the register state synchronization logic. When the interface is called, the corresponding register state synchronization logic is executed, thereby implementing the register state synchronization function.

In practice, the register state synchronization interface may be an interface function for implementing the register state synchronization function, and the code for register state synchronization may be executed by calling the interface function.

When configuring the register state synchronization interface, an interface name may be set for the register state synchronization interface, such as configuring a function name for the function. In this way, the name of the register state synchronization interface may be transferred, as a called parameter, to the main program for performing live migration of the virtual machine, thereby implementing the call of the register state synchronization interface.

The register state synchronization method corresponding to the register state synchronization interface may include: reading register state data of the passthrough device of the source virtual machine, and transferring the read register state data of passthrough device of the source virtual machine to the target virtual machine. Here, the source virtual machine is a virtual machine to be migrated, and the target virtual machine is a virtual machine that replaces the source virtual machine to perform cloud service. During the live migration of the virtual machine passthrough device, the passthrough device of the source virtual machine needs to be migrated to the target virtual machine. The target virtual machine may write the received register state data into the register of the passthrough device of the target virtual machine.

The above step 201 may be executed in the migration preparation phase which is before stopping the service of the source virtual machine. In this phase, by calling the register state synchronization interface, the register of the passthrough device of the source virtual machine and the register of the passthrough device of the target virtual machine may be synchronized to an identical working state.

In some alternative implementations of the present embodiment, register state synchronization in the migration preparation phase mainly includes synchronization of the read/write register and synchronization of the state register. The read/write register is a readable/writable register for temporarily storing read/write data. The state register is a register for temporarily storing state data. Specifically, the above step 201 may include: reading a content of a read/write register of the source virtual machine passthrough device by calling the register state synchronization interface, and transferring and writing the content of the read/write register of the source virtual machine passthrough device to a read/write register of the target virtual machine passthrough device; capturing and recording, by calling the register state synchronization interface, a read/write operation on the read/write register performed by the source virtual machine passthrough device, and executing the read/write operation performed by the source virtual machine on the target virtual machine passthrough device, to synchronize a content of a state register of the source virtual machine passthrough device to a state register of the target virtual machine passthrough device. That is to say, for the read/write register, since this type of register is readable and writable, the content of the register of the source virtual machine passthrough device may be directly read by calling the register state synchronization interface, and then wrote into the register of the target virtual machine passthrough device. For the state register, since this type of register is a read-only register, the content of the register of the source virtual machine passthrough device cannot be directly read and wrote into the register of the target virtual machine by calling the register state synchronization interface. However, the state of the state register is strongly corelated to the operation performed by the virtual machine passthrough device, therefore, by replaying once the operation of the source virtual machine on the counter virtual machine, the state register of the target virtual machine passthrough device changes in synchronization with the state register of the source virtual machine passthrough device.

Alternatively, in the migration preparation phase, the states of other registers other than the read/write register and the state register may be synchronized, including but not limited to statistical registers, write-only registers, and the like. The synchronization of the state of these registers may be realized by, canceling the passthrough state of the source virtual machine passthrough device, transferring the register state of the source virtual machine to the virtual machine monitor through the register state synchronization interface, and the virtual machine monitor synchronizing the state of these registers to the target virtual machine t.

In some alternative implementations of the present embodiment, it may judge whether the target virtual machine successfully synchronizes the register state of the passthrough device of the source virtual machine. If unsuccessful, it may rollback, cancel this migration or re-perform the register state synchronization method by calling the configured register state synchronization interface, to synchronize the register state of the source virtual machine passthrough device to the target virtual machine.

In some alternative implementations of the present embodiment, the executing body may migrate the related data of the passthrough device of the source virtual machine to the target virtual machine through the virtual machine monitor. Specifically, the step 201 of performing a register state synchronization method by calling a configured register state synchronization interface to synchronize a register state of a source virtual machine passthrough device to a target virtual machine may include: performing an operation of transferring the register state of the source virtual machine passthrough device to a virtual machine monitor by calling the configured register state synchronization interface, and synchronizing the register state acquired by the virtual machine monitor at the target virtual machine. Here, the configured register state synchronization interface may serve as an entry for the virtual machine monitor to acquire the register state of the passthrough device. In the migration preparation phase, the register state synchronization interface may be called, the code logic corresponding to the register state synchronization interface is executed, and an execution result is returned to the virtual machine monitor. In this way, the virtual machine monitor may capture the register state of the passthrough device through the register state synchronization interface. Then, the virtual machine monitor may connect to the target virtual machine and transfer the captured register state of the passthrough device to the target virtual machine. The target virtual machine may write the data transferred by the virtual machine monitor to a corresponding passthrough device register.

Step 202, cancelling a passthrough state of the source virtual machine passthrough device, and migrating the source virtual machine passthrough device to the target virtual machine by iteratively performing multiple rounds of a synchronization operation.

In the present embodiment, the above executing body may cancel the passthrough state of the source virtual machine passthrough device, so that the access of the source virtual machine to the registers of these passthrough devices may be temporarily stored in the memory of the executing body.

The source virtual machine may establish a page table responsible for the translation between the physical address of the host machine and the physical address of the virtual machine, which is used for implementing the passthrough of the passthrough device. The state of the page table may be set to "illegal" or "invalid", so that the passthrough device of the source virtual machine cannot successfully translate the physical address of the virtual machine to the physical address of the host machine according to the page table, thereby generating a page fault. In turn, the passthrough device's access to the virtual machine may be captured by the virtual machine monitor of the host machine. The above synchronization operation may include a step 2021 of synchronizing the register state and a step 2022 of synchronizing a DMA dirty page.

Specifically, in the step 2021, the register state synchronization method is ferformed by calling the configured register state synchronization interface, to capture the read/write operation on the register of the source virtual machine passthrough device in the migration process, and perform the captured read/write operation on the register of the target virtual machine passthrough device.

In the live migration execution phase, the register state may be continuously synchronized. The synchronization of the read/write operation on the register may be performed by calling the register state synchronization method corresponding to the register state synchronization interface. Since the synchronization of the register state of the passthrough device has been performed in step 201, here only the new data generated by the source virtual machine in the process of continuously providing the service in the migration process may be synchronized to the target virtual machine. Therefore, the new data may be synchronized by replaying the captured read/write operation once on the target virtual machine.

In some alternative implementations of the present embodiment, the above step 2021 of performing the register state synchronization method by calling the register state synchronization interface to capture the read/write operation on the register performed by the source virtual machine passthrough device during the migration may include: performing an operation of transferring, by calling the configured register state synchronization interface, a record of the read/write operation on the register of the source virtual machine passthrough device in the migration process to the virtual machine monitor. That is, the configured register state synchronization interface may serve as an entry for the virtual machine monitor to acquire the register state of the passthrough device. In the migration execution phase, the synchronization of new data generated by new access requests is mainly performed. The register state synchronization interface may be called to execute the code logic corresponding to the register state synchronization interface, and the code logic corresponding to the register state synchronization interface may specifically include the logic of acquiring the read/write operation data of the register of the source virtual machine passthrough device, and then the execution result is returned to the virtual machine monitor. In this way, the virtual machine monitor may capture the read/write operation on the register of the passthrough device through the register state synchronization interface. The virtual machine monitor may then transfer the captured read/write operation on the register of the passthrough device to the target virtual machine. The target virtual machine may perform the read/write operation transferred by the virtual machine monitor to write the new data generated during the migration into the corresponding passthrough device register.

In step 2022, performing a DMA dirty page synchronization method by calling a configured DMA dirty page transmission interface, to write the data corresponding to a DMA dirty page identified by the source virtual machine passthrough device into a memory of the target virtual machine.

In the present embodiment, the above executing body may pre-configure the DMA dirty page transmission interface. DMA (Direct Memory Access) is a fast data transfer mechanism that does not require CPU participation. It allows different hardware apparatuses to communicate directly without relying on the massive terminal load of the CPU. A dirty page is a physical page that is marked as a "dirty page" when a process modifies the data in the cache. A DMA dirty page indicates a dirty page marked in a DMA operation.

The DMA dirty page transmission interface may be an abstract interface of the DMA dirty page transmission logic. When the interface is called, the corresponding DMA dirty page data transmission logic is executed, thereby implementing the DMA dirty page synchronization function.

In practice, the DMA dirty page transmission interface may be an interface function for implementing the DMA dirty page transmission function, and the code for executing the DMA dirty page transmission may be executed by calling the interface function.

When configuring the DMA dirty page transmission interface, corresponding interface name may be set for the DMA dirty page transmission interface, for example, configuring a function name for the function. In this way, a DMA dirty page transmission method corresponding to the interface may be called through the name of the DMA dirty page transmission interface.

The DMA dirty page transmission method corresponding to the DMA dirty page transmission interface may include: acquiring a DMA dirty page marked by the source virtual machine, and transferring the acquired DMA dirty page to the target virtual machine, and the target virtual machine may parse the DMA dirty page to write the data therein into the memory.

In the live migration execution phase, the above executing body may read the DMA-related register to acquire the memory address of a DMA descriptor. Then, a DMA operation on the passthrough device is captured based on the memory address of the DMA descriptor, and the DMA descriptor is parsed to acquire the corresponding physical page information. Then whether the DMA operation is completed is judged by whether new data is added to a DMA descriptor list or by judging whether there is an update in the content of the physical page. For a completed DMA operation, the corresponding physical page may be identified as a dirty page. At this time, the DMA dirty page may be transferred to the target virtual machine through the DMA dirty page transmission interface to synchronize the data corresponding to the DMA dirty page.

In the live migration process, the source virtual machine does not suspend its service, and new data is generated during the process. The above executing body may iteratively execute multiple rounds of the synchronization operation in the live migration execution phase, that is, iteratively executed the steps 2021 and 2022. After the synchronization operation is completed in each round, whether the difference between the dirty page rate of the current round and the dirty page rate of the preceding round is less than a preset threshold is judged. If yes, the service of the source virtual machine may be temporarily stopped, specifically, a read/write failure message may be returned to the client that issues the read/write request. Then, the synchronization operation is performed one time again to synchronize all the data of the source virtual machine to the target virtual machine. Then, the service of the target virtual machine is started, and the passthrough state of the passthrough device register is restored on the target virtual machine, so that the I/O performance of the target virtual machine is optimal.

Specifically, the passthrough state of the register of the target virtual machine passthrough device may be restored, by restoring the state of the page table for translating the host machine physical address and the virtual machine physical address to "legal" or "valid", enabling the target virtual machine to directly access to devices such as network cards and GPUs.

In some alternative implementations of the present embodiment, the above step 2022 of performing a DMA dirty page synchronization method by calling a configured DMA dirty page transmission interface, to write data corresponding to a DMA dirty page identified by the source virtual machine passthrough device into a memory of the target virtual machine, may include: performing an operation of transferring the DMA dirty page identified by the source virtual machine passthrough device to the virtual machine monitor by calling the configured DMA dirty page transmission interface; reading, by the target virtual machine, the DMA dirty page acquired by the virtual machine monitor, parsing the DMA dirty page to obtain the data modified by DMA in the migration process, and writing the data obtained by parsing into the memory of the target virtual machine. That is, similar to the register state synchronization interface, the DMA dirty page transmission interface may also serve as an entry for the virtual machine monitor to capture the DMA dirty page data. The virtual machine monitor may read the DMA dirty page generated by the source virtual machine passthrough device through the DMA dirty page transmission interface, and transfer to the target virtual machine for DMA dirty page parsing, thereby writing the corresponding data into the memory of the target virtual machine.

The live migration method for a virtual machine passthrough device provided by the embodiments of the present disclosure, first performs a register state synchronization method by calling a configured register state synchronization interface to synchronize a register state of a source virtual machine passthrough device to a target virtual machine; then cancels the passthrough state of the source virtual machine passthrough device, and migrates the source virtual machine passthrough device to the target virtual machine by iteratively executing multiple rounds of a synchronization operation, the synchronization operation including: performing the register state synchronization method by calling the register state synchronization interface to capture a read/write operation on a register of the source virtual machine passthrough device in a migration process, and executing the captured read/write operation on a register of a target virtual machine passthrough device; and performs a DMA dirty page synchronization method by calling a configured DMA dirty page transmission interface, to write data corresponding to a DMA dirty page identified by the source virtual machine passthrough device into a memory of the target virtual machine. The related data of the source virtual machine passthrough device may be transferred to the target virtual machine during the virtual machine live migration through the configured register state synchronization interface and the DMA dirty page transmission interface, thereby realizing the live migration of the passthrough device without changing the virtual machine kernel, and simplifying the implementation of virtual machine live migration. The live migration method for a virtual machine passthrough device may be applied to the virtual machine migration of operating systems such as linux and windows, which expands the application range of the virtual machine live migration method.

Figure 3:
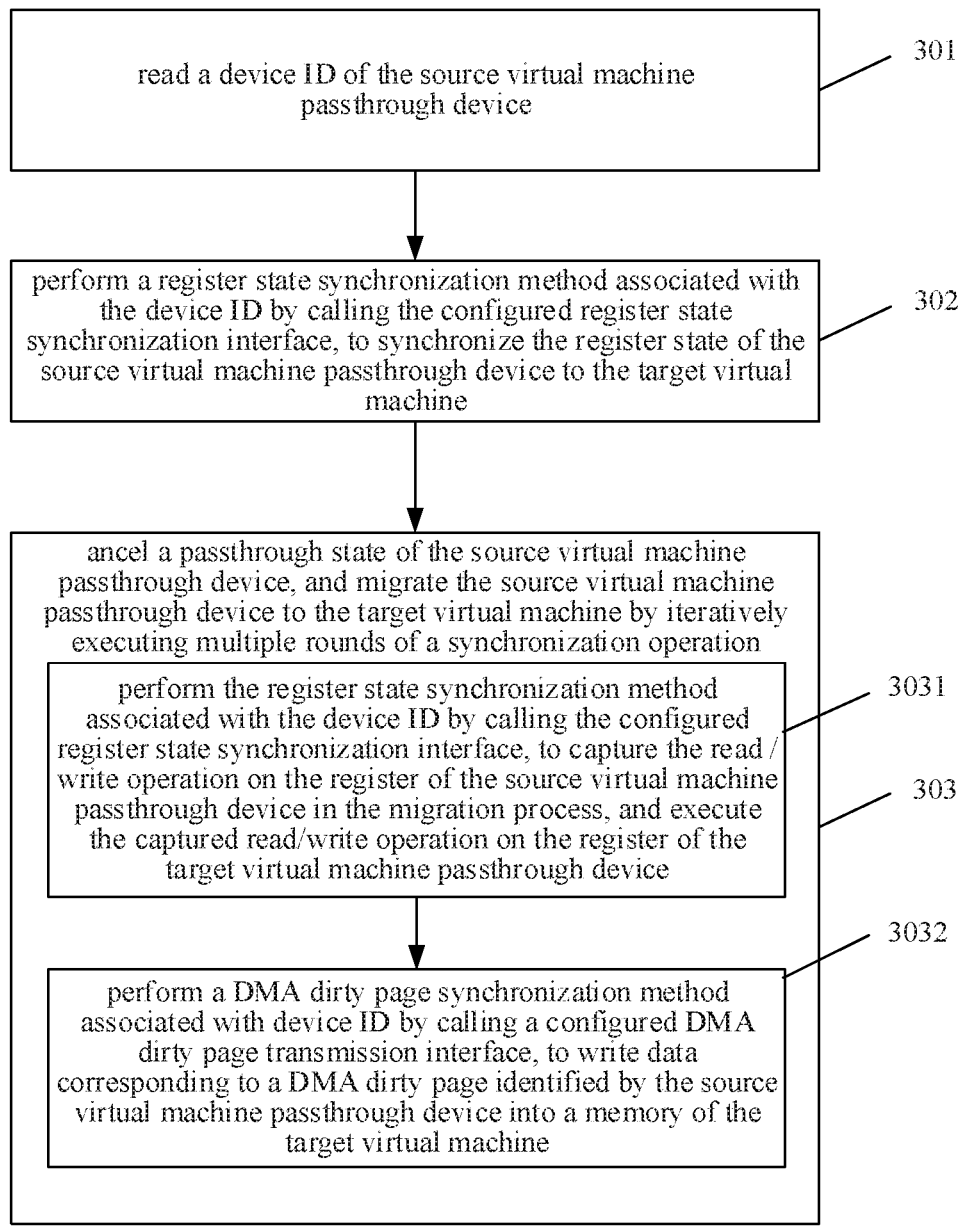
FIG. 3 is a flowchart of another embodiment of the live migration method for a virtual machine passthrough device according to the present disclosure.

With further reference to FIG. 3, a flowchart of another embodiment of the live migration method for a virtual machine passthrough device according to the present disclosure is illustrated. As shown in FIG. 3, the flow 300 of the live migration method for a virtual machine passthrough device of the present embodiment may include the following steps:

Step 301, reading a device identification (ID) of the source virtual machine passthrough device.

In the present embodiment, the virtual machine may access to multiple passthrough devices in a passthrough mode. Different passthrough devices may provide different access modes, and the corresponding registers are different in composition and location, so the logic of that the virtual machine accesses to different passthrough devices is different. To completely migrate the related data of each passthrough device of the virtual machine to the target virtual machine during live migration, the device IDs of the source virtual machine passthrough devices may be read to distinguish the different passthrough devices based on the device IDs. Here, the device ID may consist of a bus number and a device number.

Step 302, executing a register state synchronization method associated with the device ID by calling the configured register state synchronization interface, to synchronize a register state of a source virtual machine passthrough device to the target virtual machine.

In the present embodiment, the register state synchronization interface encapsulates register state synchronization logics for different passthrough devices. In addition, the register state synchronization logic of a passthrough device is associated with its device ID. The association relationship between the device ID and the logic implementing the register state synchronization method for the passthrough device identified by the device ID may be preset. In the migration preparation phase, after the register state synchronization interface is called, a register state synchronization logic may be acquired based on the device ID of the to-be-migrated passthrough device, and a synchronization operation of the register state of the corresponding passthrough device may be executed. Specifically, the device ID of the passthrough device read in step 301 may be transferred as a parameter to the called register state synchronization interface, so that the register state synchronization interface may execute a corresponding state synchronization method based on the parameter.

In some alternative implementations of the present embodiment, register state synchronization in the migration preparation phase may include synchronization of the read/write register and synchronization of the state register. A register state synchronization logic associated with a device ID may be executed by calling the register state synchronization interface, to read the content of the read/write register of the source virtual machine passthrough device and record the operation performed by the source virtual machine on the state register of the passthrough device, transfer and write the content of the read/write register of the source virtual machine passthrough device to the read/write register of the target virtual machine passthrough device, and execute on the target virtual machine, the recorded operation of the source virtual machine on the state register of the passthrough device.

Alternatively, the above executing body may use the virtual machine monitor to migrate related data of the passthrough device of the source virtual machine to the target virtual machine. Specifically, after the register state interface is called to perform the register state synchronization method associated with the device ID, the result may be transferred to the virtual machine monitor through the register state interface, and the register state of the passthrough device is synchronized to the register of the passthrough device of the target virtual machine by the virtual machine monitor.

Step 303, cancelling a passthrough state of the source virtual machine passthrough device, and migrating the source virtual machine passthrough device to the target virtual machine by iteratively executing multiple rounds of the synchronization operation.

In the present embodiment, the above executing body may cancel the passthrough state of the source virtual machine passthrough device, so that the access of the source virtual machine to the registers of these passthrough devices may all be recorded in the executing body.

The synchronization operation in the above step 303 may include a step 3031 of synchronizing the register state and a step 3032 of synchronizing a DMA dirty page.

In step 3031, executing the register state synchronization method associated with the device ID by calling the configured register state synchronization interface, to capture the read/write operation on the register of the source virtual machine passthrough device in the migration process, and execute the captured read/write operation on the register of the target virtual machine passthrough device.

In the live migration execution phase, the register state may be continuously synchronized. Specifically, the device ID may be transferred as a parameter to the register state synchronization interface, and when the register state synchronization interface is called, the register state synchronization method associated with the device ID is executed to capture the read/write operation of the source virtual machine on the register of the passthrough device, and further an identical read/write operation is executed on the register of the target virtual machine passthrough device, to ensure the integrity of the data after migration.

In step 3032, performing a DMA dirty page synchronization method associated with device ID by calling a configured DMA dirty page transmission interface, to write data corresponding to a DMA dirty page identified by the source virtual machine passthrough device into a memory of the target virtual machine.

A device ID may be transferred as a parameter to the DMA dirty page transmission interface, and the DMA dirty page transmission method associated with this device ID is executed when the DMA dirty page transmission interface is called. Here, the DMA dirty page transmission method may include: reading a DMA dirty page identified by the source virtual machine passthrough device, and transferring the DMA dirty page identified by the source virtual machine to the target virtual machine, and the target virtual machine writing the data obtained by parsing the received DMA dirty page into the memory.

Alternatively, the above steps 3031 and 3032 may transfer the register state and the DMA dirty page to the virtual machine monitor through the register state synchronization interface and the DMA dirty page transmission interface, respectively, that is, the virtual machine monitor may capture the register state data and the DMA dirty page data of the source virtual machine passthrough device through the configured register state synchronization interface and the DMA dirty page transmission interface, and then synchronize, based on the device ID, the captured register state data and the DMA dirty page data to the register of a corresponding passthrough device of the target virtual machine.

In the present embodiment, similar to the embodiment shown in FIG. 2, multiple rounds of the synchronization operation may be iteratively performed in the live migration execution phase, i.e., steps 3031 and 3032 are iteratively performed. After the synchronization operation is completed in each round, whether the difference between the dirty page rate of the current round and the dirty page rate of the preceding round is less than a preset threshold is judged. If yes, the service of the source virtual machine may be temporarily stopped, Specifically, a read/write failure message may be returned to the client that issues the read/write request. Then, the synchronization operation is performed one time again to synchronize all the data of the source virtual machine to the target virtual machine. Then, the service of the target virtual machine is started, and the passthrough state of the passthrough device register is restored on the target virtual machine, so that the I/O performance of the target virtual machine is optimal.

Figure 4:
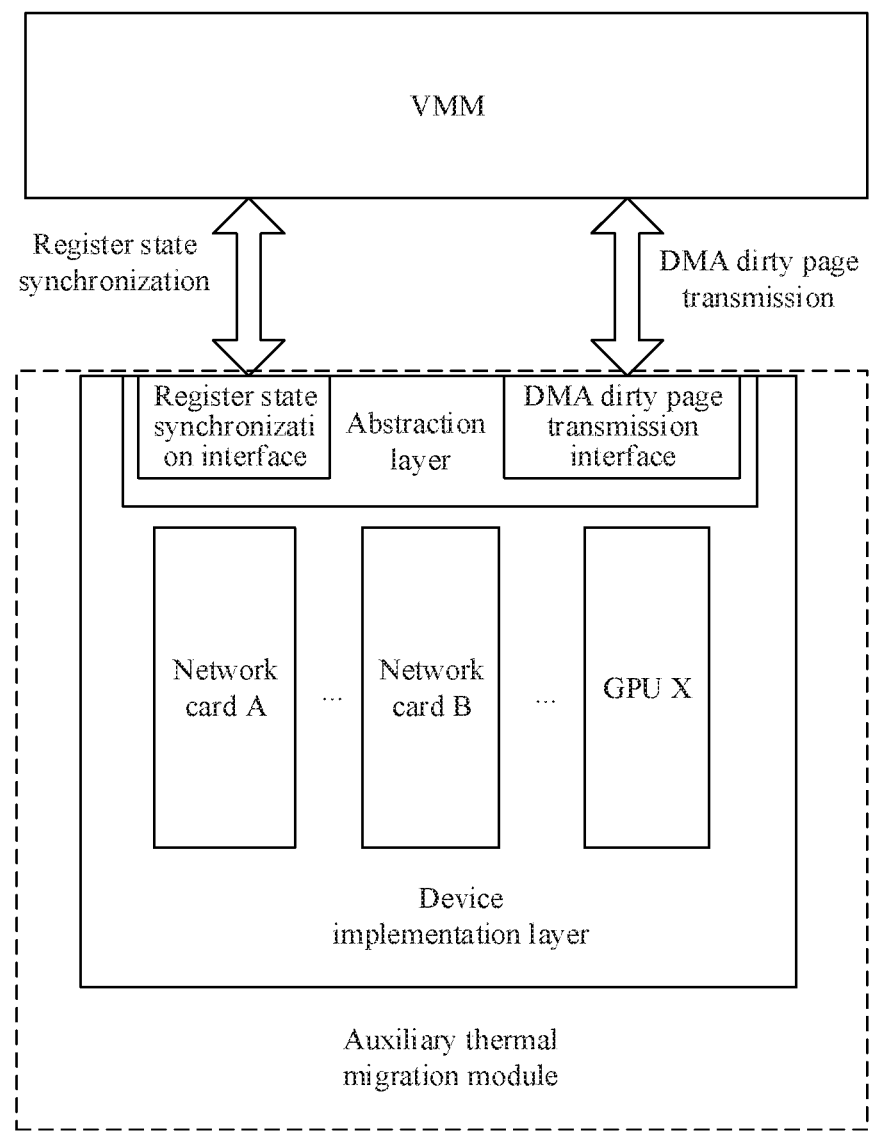
FIG. 4 is a schematic block diagram of the live migration method for a virtual machine passthrough device according to the present disclosure.

Referring to FIG. 4, which shows an exemplary framework of the live migration method for a virtual machine passthrough device in FIG. 3. As shown in FIG. 4, the framework of the live migration method for a virtual machine passthrough device may include an auxiliary live migration module and a virtual machine monitor VMM. The auxiliary live migration module may be configured in the host machine of the virtual machine, and the auxiliary live migration module may include an abstraction layer and a device implementation layer. The abstraction layer may include a pre-configured register state synchronization interface and DMA dirty page transmission interface. The register state synchronization interface may be an interface that abstracts register state synchronization logics of different passthrough devices (such as network card A, network card B, GPU X as shown in FIG. 4) and provides the abstracted logics to the virtual machine monitor. The DMA dirty page transmission interface may be an interface that abstracts DMA dirty page transmission logics of different passthrough devices (such as network card A, network card B, GPU X as shown in FIG. 4), and provides the abstracted logics to the virtual machine monitor (VMM). The device implementation layer may include register state synchronization logics and DMA dirty page transmission logics associated with the respective passthrough devices. In this way, during the live migration of the passthrough devices of the virtual machine, the register state synchronization method and the DMA dirty page transmission method for the passthrough devices may be implemented through the interfaces provided by the abstraction layer, to transfer the register states and the DMA dirty pages of the passthrough devices to the virtual machine monitor. In turn, the virtual machine monitor is used to dominate the migration of the passthrough devices.

As can be seen from FIG. 3 and FIG. 4, the migration method for a virtual machine passthrough device of the present embodiment, by reading the device ID of the to-be-migrated passthrough device, a register state and DMA dirty page synchronization method of the corresponding passthrough device may be found and executed based on the device ID when the register state synchronization interface and the DMA dirty page transmission interface are called, which enables live migration of different passthrough devices of the source virtual machine, and further ensures that data is completely synchronized to the new virtual machine during the migration, ensuring the proper functioning of the virtual machine after migration.

Figure 5:
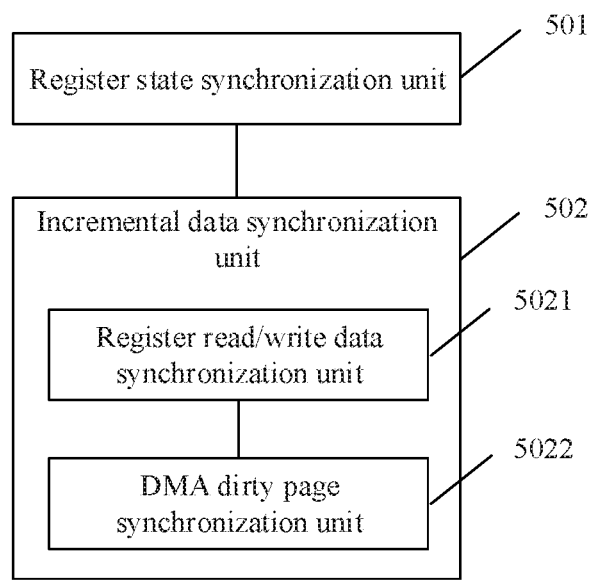
FIG. 5 is a schematic structural diagram of a live migration apparatus for a virtual machine passthrough device according to the present disclosure.

With further reference to FIG. 5, as an implementation of the method shown in the above figures, the present disclosure provides an embodiment of a thermal migration apparatus for a virtual machine passthrough device, and the embodiment of the apparatus corresponds to the embodiment of the method as shown in FIG. 2 or FIG. 3, and the apparatus may be specifically applied to various electronic devices.

As shown in FIG. 5, the live migration apparatus 500 of a virtual machine passthrough device of the present embodiment may include: a register state synchronization unit 501 and an incremental data synchronization unit 502. Here, the register state synchronization unit 501 may be configured to execute a register state synchronization method by calling a configured register state synchronization interface, to synchronize a register state of a source virtual machine passthrough device to a target virtual machine. The incremental data synchronization unit 502 may be configured to cancel a passthrough state of the source virtual machine passthrough device, and migrate the source virtual machine passthrough device to the target virtual machine by iteratively executing multiple rounds of a synchronization operation. The incremental data synchronization unit 502 may include a register read/write data synchronization unit 5021 and a DMA dirty page synchronization unit 5022. The register read/write data synchronization unit 5021 is configured to execute the following synchronization operations: executing the register state synchronization method by calling the configured register state synchronization interface, to capture a read/write operation on a register of the source virtual machine passthrough device in a migration process, and executing the captured read/write operation on a register of a target virtual machine passthrough device. The DMA dirty page synchronization unit 5022 is configured to perform the following synchronization operations: executing a DMA dirty page synchronization method by calling a configured DMA dirty page transmission interface, to write data corresponding to a DMA dirty page identified by the source virtual machine passthrough device into a memory of the target virtual machine.

In some embodiments, the register state synchronization unit 501 may be further configured to: execute an operation of transferring the register state of the source virtual machine passthrough device to a virtual machine monitor by calling the configured register state synchronization interface, and synchronize the register state acquired by the virtual machine monitor at the target virtual machine; and the register read/write data synchronization unit is further configured to: execute an operation of transferring a record of the read/write operation on the register of the source virtual machine passthrough device in the migration process to the virtual machine monitor by calling the configured register state synchronization interface.

In some embodiments, the DMA dirty page synchronization unit 5022 may be further configured to: execute an operation of transferring the DMA dirty page identified by the source virtual machine passthrough device to the virtual machine monitor by calling the configured DMA dirty page transmission interface; and read, by the target virtual machine, the DMA dirty page acquired by the virtual machine monitor, parse the DMA dirty page to obtain data modified in the migration process by DMA, and write the data obtained by parsing into the memory of the target virtual machine.

In some embodiments, the apparatus 500 may further include: a reading unit, configured to read a device ID of the source virtual machine passthrough device. The register state synchronization unit 501 may be further configured to execute a register state synchronization method associated with the device ID by calling the configured register state synchronization interface; the register read/write data synchronization unit 5021 may be further configured to execute a register state synchronization method associated with the device ID by calling the configured register state synchronization interface; and the DMA dirty page synchronization unit 5022 may be further configured to execute a DMA dirty page synchronization method associated with the device ID by calling the configured DMA dirty page transmission interface.

In some embodiments, the register state synchronization unit 501 may be further configured to synchronize a register state of a source virtual machine passthrough device to a target virtual machine as follows: reading a content of a read/write register of the source virtual machine passthrough device by calling the register state synchronization interface, and transferring and writing the content of the read/write register of the source virtual machine passthrough device to a read and write register of the target virtual machine passthrough device; capturing and recording a read/write operation of the source virtual machine passthrough device on the read/write register by calling the register state synchronization interface, and executing the read/write operation of the source virtual machine on the target virtual machine passthrough device, to synchronize a content of a state register of the source virtual machine passthrough device to a state register of the target virtual machine passthrough device.

The units described in the apparatus 500 correspond to the various steps in the method described with reference to FIGS. 2 and 3. Thus, the operations and features described above for the method embodiments and their alternative implementations are equally applicable to the apparatus 500 and the units contained therein, and detailed description thereof will be omitted.

In the live migration apparatus for a virtual machine passthrough device provided by the above embodiments of the present disclosure, the register state synchronization unit executes a register state synchronization method by calling a configured register state synchronization interface to synchronize a register state of a source virtual machine passthrough device to a target virtual machine; then, the incremental data synchronization unit cancels a passthrough state of the source virtual machine passthrough device, and migrates the source virtual machine passthrough device to the target virtual machine by iteratively performing multiple rounds of a synchronization operation; the incremental data synchronization unit includes a register read/write data synchronization unit and a DMA dirty page synchronization unit, and the register read/write data synchronization unit is configured to execute the following synchronization operations: executing the register state synchronization method by calling the configured register state synchronization interface, to capture a read/write operation on a register of the source virtual machine passthrough device in a migration process, and executing the captured read/write operation on a register of a target virtual machine passthrough device; the DMA dirty page synchronization unit is configured to perform the following synchronization operations: executing a DMA dirty page synchronization method by calling a configured DMA dirty page transmission interface, to write data corresponding to a DMA dirty page identified by the source virtual machine passthrough device into a memory of the target virtual machine. The data related to the source virtual machine passthrough device may be transferred to a target virtual machine during the virtual machine live migration through the configured register state synchronization interface and the DMA dirty page transmission interface, thereby realizing the live migration of the passthrough device without changing the virtual machine kernel.

Figure 6:
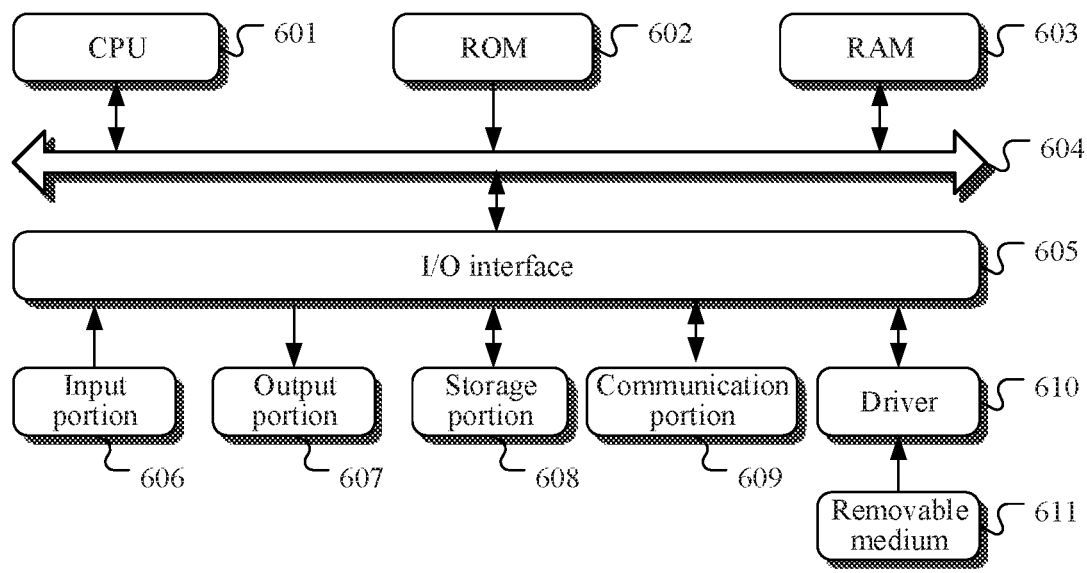
FIG. 6 is a schematic structural diagram of a computer system adapted to implement a server of the embodiments of the present disclosure.

With further reference to FIG. 6, a schematic structural diagram of a computer system 600 adapted to implement a server of the embodiments of the present disclosure is shown. The server shown in FIG. 6 is merely an example, and should not limit the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, described as: a processor, including a register state synchronization unit and an incremental data synchronization unit. Here, the names of these units do not in some cases constitute a limitation to such units themselves. For example, the register state synchronization unit may also be described as "a unit for performing a register state synchronization method by calling a configured register state synchronization interface to synchronize a register state of a source virtual machine passthrough device to a target virtual machine."

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: perform a register state synchronization method by calling a configured register state synchronization interface to synchronize a register state of a source virtual machine passthrough device to a target virtual machine; cancel a passthrough state of the source virtual machine passthrough device, and migrate the source virtual machine passthrough device to the target virtual machine by iteratively executing multiple rounds of a synchronization operation; the synchronization operations including: performing the register state synchronization method by calling the configured register state synchronization interface to capture a read/write operation on a register of the source virtual machine passthrough device in a migration process, and executing the captured read/write operation on a register of a target virtual machine passthrough device; performing a DMA dirty page synchronization method by calling a configured DMA dirty page transmission interface, to write data corresponding to a DMA dirty page identified by the source virtual machine passthrough device into a memory of the target virtual machine.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A live migration method for a virtual machine passthrough device, the method comprising:
   in a migration preparation phase, performing a register state synchronization method by calling a configured register state synchronization interface, to synchronize a register state of a source virtual machine passthrough device to a target virtual machine, wherein the configured register state synchronization interface encapsulates a register state synchronization logic for the source virtual machine passthrough device;
   in a live migration execution phase, disabling a passthrough state of the source virtual machine passthrough device, and migrating the source virtual machine passthrough device to the target virtual machine by iteratively executing multiple rounds of a synchronization operation, comprising:
   performing the register state synchronization method by calling the configured register state synchronization interface, to capture a read/write operation on a register of the source virtual machine passthrough device in a migration process, and executing the captured read/write operation on a register of a target virtual machine passthrough device; and
   performing a Direct Memory Access (DMA) dirty page synchronization method by calling a configured DMA dirty page transmission interface, to write data corresponding to a DMA dirty page identified by the source virtual machine passthrough device into a memory of the target virtual machine.

2. The method according to claim 1, wherein the performing a register state synchronization method by calling a configured register state synchronization interface to synchronize a register state of a source virtual machine passthrough device to a target virtual machine comprises:
   executing an operation of transferring the register state of the source virtual machine passthrough device to a virtual machine monitor by calling the configured register state synchronization interface, and synchronizing the register state acquired by the virtual machine monitor at the target virtual machine; and
   the performing the register state synchronization method by calling the configured register state synchronization interface to capture a read/write operation on a register of the source virtual machine passthrough device in a migration process, comprises:
   executing an operation of transferring a record of the read/write operation on the register of the source virtual machine passthrough device in the migration process to the virtual machine monitor by calling the configured register state synchronization interface.

3. The method according to claim 1, wherein the performing a DMA dirty page synchronization method by calling a configured DMA dirty page transmission interface, to write data corresponding to a DMA dirty page identified by the source virtual machine passthrough device into a memory of the target virtual machine comprises:
   executing an operation of transferring the DMA dirty page identified by the source virtual machine passthrough device to the virtual machine monitor by calling the configured DMA dirty page transmission interface; and
   reading, by the target virtual machine, the DMA dirty page acquired by the virtual machine monitor, parsing the DMA dirty page to obtain data modified in the migration process by DMA, and writing the data obtained by parsing into the memory of the target virtual machine.

4. The method according to claim 1, the method further comprising:
   reading a device ID of the source virtual machine passthrough device;
   the performing a register state synchronization method by calling a configured register state synchronization interface comprises:
   performing a register state synchronization method associated with the device ID by calling the configured register state synchronization interface; and
   the performing a DMA dirty page synchronization method by calling a configured DMA dirty page transmission interface comprises:
   performing a DMA dirty page synchronization method associated with the device ID by calling the configured DMA dirty page transmission interface.

5. The method according to claim 2, the method further comprising:
   reading a device ID of the source virtual machine passthrough device;
   the performing a register state synchronization method by calling a configured register state synchronization interface comprises:

performing a register state synchronization method associated with the device ID by calling the configured register state synchronization interface; and the performing a DMA dirty page synchronization method by calling a configured DMA dirty page transmission interface comprises:

performing a DMA dirty page synchronization method associated with the device ID by calling the configured DMA dirty page transmission interface.

6. The method according to claim 3, the method further comprising:

reading a device ID of the source virtual machine passthrough device;

the performing a register state synchronization method by calling a configured register state synchronization interface comprises:

performing a register state synchronization method associated with the device ID by calling the configured register state synchronization interface; and the performing a DMA dirty page synchronization method by calling a configured DMA dirty page transmission interface comprises:

performing a DMA dirty page synchronization method associated with the device ID by calling the configured DMA dirty page transmission interface.

7. The method according to claim 1, wherein the performing a register state synchronization method by calling a configured register state synchronization interface to synchronize a register state of a source virtual machine passthrough device to a target virtual machine comprises:

reading a content of a read/write register of the source virtual machine passthrough device by calling the register state synchronization interface, and transferring and writing the content of the read/write register of the source virtual machine passthrough device to a read/write register of the target virtual machine passthrough device;

capturing and recording a read/write operation of the source virtual machine passthrough device on the read/write register by calling the register state synchronization interface, and executing the read/write operation of the source virtual machine on the target virtual machine passthrough device, to synchronize a content of a state register of the source virtual machine passthrough device to a state register of the target virtual machine passthrough device.

8. A live migration apparatus for a virtual machine passthrough device, the apparatus comprising:

at least one processor; and a memory storing instructions, the instructions when executed by the at least one processor, cause the at least one processor to perform operations, the operations comprising:

in a migration preparation phase, performing a register state synchronization method by calling a configured register state synchronization interface, to synchronize a register state of a source virtual machine passthrough device to a target virtual machine, wherein the configured register state synchronization interface encapsulates a register state synchronization logic for the source virtual machine passthrough device;

in a live migration execution phase, disabling a passthrough state of the source virtual machine passthrough device, and migrating the source virtual machine passthrough device to the target virtual machine by iteratively executing multiple rounds of a synchronization operation, comprising:

performing the register state synchronization method by calling the configured register state synchronization interface, to capture a read/write operation on a register of the source virtual machine passthrough device in a migration process, and executing the captured read/write operation on a register of a target virtual machine passthrough device; and performing a Direct Memory Access (DMA) dirty page synchronization method by calling a configured DMA dirty page transmission interface, to write data corresponding to a DMA dirty page identified by the source virtual machine passthrough device into a memory of the target virtual machine.

9. The apparatus according to claim 8, wherein the performing a register state synchronization method by calling a configured register state synchronization interface to synchronize a register state of a source virtual machine passthrough device to a target virtual machine comprises:

executing an operation of transferring the register state of the source virtual machine passthrough device to a virtual machine monitor by calling the configured register state synchronization interface, and synchronizing the register state acquired by the virtual machine monitor at the target virtual machine; and the performing the register state synchronization method by calling the configured register state synchronization interface to capture a read/write operation on a register of the source virtual machine passthrough device in a migration process, comprises:

executing an operation of transferring a record of the read/write operation on the register of the source virtual machine passthrough device in the migration process to the virtual machine monitor by calling the configured register state synchronization interface.

10. The apparatus according to claim 8, wherein the performing a DMA dirty page synchronization method by calling a configured DMA dirty page transmission interface, to write data corresponding to a DMA dirty page identified by the source virtual machine passthrough device into a memory of the target virtual machine comprises:

executing an operation of transferring the DMA dirty page identified by the source virtual machine passthrough device to the virtual machine monitor by calling the configured DMA dirty page transmission interface; and reading, by the target virtual machine, the DMA dirty page acquired by the virtual machine monitor, parsing the DMA dirty page to obtain data modified in the migration process by DMA, and writing the data obtained by parsing into the memory of the target virtual machine.

11. The apparatus according to claim 8, wherein the operations further comprise:

reading a device ID of the source virtual machine passthrough device;

the performing a register state synchronization method by calling a configured register state synchronization interface comprises:

performing a register state synchronization method associated with the device ID by calling the configured register state synchronization interface; and the performing a DMA dirty page synchronization method by calling a configured DMA dirty page transmission interface comprises:
performing a DMA dirty page synchronization method associated with the device ID by calling the configured DMA dirty page transmission interface.

12. The apparatus according to claim 9, wherein the operations further comprise:
reading a device ID of the source virtual machine passthrough device;
the performing a register state synchronization method by calling a configured register state synchronization interface comprises:
performing a register state synchronization method associated with the device ID by calling the configured register state synchronization interface; and
the performing a DMA dirty page synchronization method by calling a configured DMA dirty page transmission interface comprises:
performing a DMA dirty page synchronization method associated with the device ID by calling the configured DMA dirty page transmission interface.

13. The apparatus according to claim 10, wherein the operations further comprise:
reading a device ID of the source virtual machine passthrough device;
the performing a register state synchronization method by calling a configured register state synchronization interface comprises:
performing a register state synchronization method associated with the device ID by calling the configured register state synchronization interface; and
the performing a DMA dirty page synchronization method by calling a configured DMA dirty page transmission interface comprises:
performing a DMA dirty page synchronization method associated with the device ID by calling the configured DMA dirty page transmission interface.

14. The apparatus according to claim 8, wherein the performing a register state synchronization method by calling a configured register state synchronization interface to synchronize a register state of a source virtual machine passthrough device to a target virtual machine comprises:
reading a content of a read/write register of the source virtual machine passthrough device by calling the register state synchronization interface, and transferring and writing the content of the read/write register of the source virtual machine passthrough device to a read/write register of the target virtual machine passthrough device;
capturing and recording a read/write operation of the source virtual machine passthrough device on the read/write register by calling the register state synchronization interface, and executing the read/write operation of the source virtual machine on the target virtual machine passthrough device, to synchronize a content of a state register of the source virtual machine passthrough device to a state register of the target virtual machine passthrough device.

15. A non-transitory computer readable storage medium, storing a computer program thereon, the computer program, when executed by a processor, cause the processor to perform operations, the operations comprising:
in a migration preparation phase, performing a register state synchronization method by calling a configured register state synchronization interface, to synchronize a register state of a source virtual machine passthrough device to a target virtual machine, wherein the configured register state synchronization interface encapsulates a register state synchronization logic for the source virtual machine passthrough device;
in a live migration execution phase, disabling a passthrough state of the source virtual machine passthrough device, and migrating the source virtual machine passthrough device to the target virtual machine by iteratively executing multiple rounds of a synchronization operation, comprising:
performing the register state synchronization method by calling the configured register state synchronization interface, to capture a read/write operation on a register of the source virtual machine passthrough device in a migration process, and executing the captured read/write operation on a register of a target virtual machine passthrough device; and
performing a Direct Memory Access (DMA) dirty page synchronization method by calling a configured DMA dirty page transmission interface, to write data corresponding to a DMA dirty page identified by the source virtual machine passthrough device into a memory of the target virtual machine.

* * * * *